(12) United States Patent
Rollins et al.

(10) Patent No.: US 7,508,512 B1
(45) Date of Patent: Mar. 24, 2009

(54) CONTINUOUS OPTICAL SELF-ALIGNMENT FOR LIGHT CURTAINS AND OPTICAL PRESENCE SENSORS FOR SIMPLIFICATION AND MAINTENANCE OF ALIGNMENT

(75) Inventors: George E. Rollins, Chelmsford, MA (US); James E. Dogul, Hudson, NH (US); Richard Galera, Nashua, NH (US); Derek W. Jones, Kirkcudbright (GB); George Schuster, Royal Oak, MI (US); Suresh Nair, Amherst, NH (US); Ray Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 356 days.

(21) Appl. No.: 11/360,176

(22) Filed: Feb. 23, 2006

(51) Int. Cl.
*G01B 11/00* (2006.01)
*G02F 1/1345* (2006.01)

(52) U.S. Cl. ............... 356/399; 356/121; 356/138; 356/432; 349/139

(58) Field of Classification Search ............. 250/221, 250/229, 232, 559.12, 621–622; 349/61–65, 349/123, 193; 356/121, 153, 213, 218–222, 356/399–401, 616; 359/237
See application file for complete search history.

(56) References Cited

U.S. PATENT DOCUMENTS

| | | | |
|---|---|---|---|
| 5,243,183 A | 9/1993 | Barron, Jr. et al. | |
| 5,289,007 A | 2/1994 | Hergert | |
| 5,302,942 A | 4/1994 | Blau | |
| 5,393,973 A | 2/1995 | Blau | |
| 5,528,391 A * | 6/1996 | Elrod | 349/1 |
| 6,124,586 A | 9/2000 | De Coi | |
| 6,554,189 B1 * | 4/2003 | Good et al. | 235/462.01 |
| 6,710,325 B2 | 3/2004 | Kuhar | |
| 6,903,327 B1 | 6/2005 | Appleyard | |
| 6,979,814 B2 | 12/2005 | Kuda et al. | |
| 7,251,068 B2 * | 7/2007 | Maram et al. | 359/239 |
| 2004/0118980 A1 | 6/2004 | Chang et al. | |

* cited by examiner

*Primary Examiner*—Tarifur Chowdhury
*Assistant Examiner*—Tara S Pajoohi
(74) *Attorney, Agent, or Firm*—Amin Turocy & Calvin LLP; William R. Walbrun (57) ABSTRACT

Systems and methods are disclosed that facilitate tolerating and/or correcting light beam misalignment in a light-emitting device, such as a light curtain. Attributes of the light beam can be assessed and compared to predetermined threshold values to evaluate whether the light beam is misaligned, and corrective feedback can be generated to adjust the position of one or more transmissive apertures generated on an LCD, through which light is permitted to pass, in order to re-align the light beam.

14 Claims, 10 Drawing Sheets

CONTINUOUS OPTICAL SELF-ALIGNMENT FOR LIGHT CURTAINS AND OPTICAL PRESENCE SENSORS FOR SIMPLIFICATION AND MAINTENANCE OF ALIGNMENT

TECHNICAL FIELD

The subject invention relates generally to industrial safety systems and, more particularly, to light curtain alignment.

BACKGROUND

In many industrial environments, manufacturing processes have become automated and industrial efficiency has risen substantially in recent years. While efficiency is important in generating a product and meeting consumer demand, safety is also an important aspect of industrial design. Many safety features have been implemented in attempts to minimize injury to operators and/or other personnel in an industrial environment, such as a factory or manufacturing plant. For instance, emergency shut-off systems can be brightly colored and positioned at points of easy access to permit an operator to shut down a dangerous machine in the event of an accident. However, such systems are typically only employed when it is too late, such as after an accident.

Other safety devices are designed to facilitate providing a safe manufacturing environment are directed toward shutting down dangerous equipment before an accident happens. For instance, one such safety device is a safety light curtain, which is employed to prevent injury by detecting an interruption of one or more light beams comprising the light curtain. In this manner, object detection can be achieved based on interrupted light beams, and can be performed at varying levels of sensitivity. For instance, light beams can be designed and/or set to detect an object the size of a finger, a hand, a limb, etc., depending on a particular application associated with the device from which the light curtain is intended to protect a human operator. Typical light curtains comprise a plurality of emitters and receivers, where each respective emitter-receiver pair must be critically aligned in order to ensure proper operation. For instance, an emitter and receiver must be aligned to ensure that emitted light is received by a corresponding receiver when there is no obstruction in the path of the light beam. If the emitter and receiver fall out of alignment, a false alarm condition can be generated (e.g., the light curtain will register an obstruction because the expected light beam is not received at the receiver.

Conventional light curtain systems can thus be costly to maintain with regard to both time and money. Ensuring that each and every emitter-receiver pair in the light curtain is critically aligned can require substantial time investment, resulting in machine down-time during maintenance and reduced productivity. Thus, there is a need in the art for systems and/or methods that overcome such deficiencies.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

In accordance with various aspects described herein, systems and methods are presented that facilitate simplifying alignment of light beam(s) in, for example, a light curtain or similar monitoring device. According to one aspect, a system that facilitates tolerating and/or correcting misalignment of a light beam can comprise a an emitter and a receiver that respectively emit the light beam from a first side of a monitored area and detect the beam on the opposite side of the monitored area. Absence of the beam or a portion thereof can be indicative of an impediment in the monitored area, which, in the case of a light curtain employed as a safety device, can trigger a shut-down of piece of equipment associated with the light curtain. The system can further comprise an LCD, positioned between the emitter and the monitored area, on which transmissive apertures can be generated at desired locations to permit passage of emitted light. Light that is permitted to pass through the transmissive apertures can then be focused by a lens before traversing the monitored area. At the receiver side of the system, light can be re-focused (e.g., diffracted, . . . ) by a second lens and passed through transmissive apertures on a receiver-side LCD before being detected by the receiver. The beam can be monitored by a control component, which can send a feedback signal to one or both of the LCDs upon a determination that the beam is out of alignment. The beam can be corrected by adjusting the position(s) of the transmissive apertures on the LCDs, without requiring precise alignment of the emitter and receiver relative to each other. Thus, the subject system can ameliorate deficiencies associated with conventional systems that require precise emitter-receiver alignment in order to operate properly.

According to another aspect, methods are described that facilitate analyzing and adjusting a light beam in a light curtain or similar device. For instance, Cartesian coordinates associated with the light beam as it passes through transmissive apertures on either or both of an emitter-side LCD and a receiver-side LCD can be evaluated, and such information can be utilized to determine whether the beam is within a target tolerance. If the beam is determined to be out of tolerance (e.g., outside of a predefined acceptable range for one or both of an x-coordinate and a y-coordinate), then the transmissive apertures one the LCD(s) can be regenerated in a new position to correct for the misalignment of the beam. Additionally and/or alternatively, an angle of transmission of the beam can be evaluated, based in part on the coordinates of the beam as it traverses the LCDs and knowledge of the positions of the LCDs relative to each other. In this manner, the emitter and receiver need not be realigned when the light beam is out of tolerance, in contrast to conventional light curtain systems.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Figure 1:
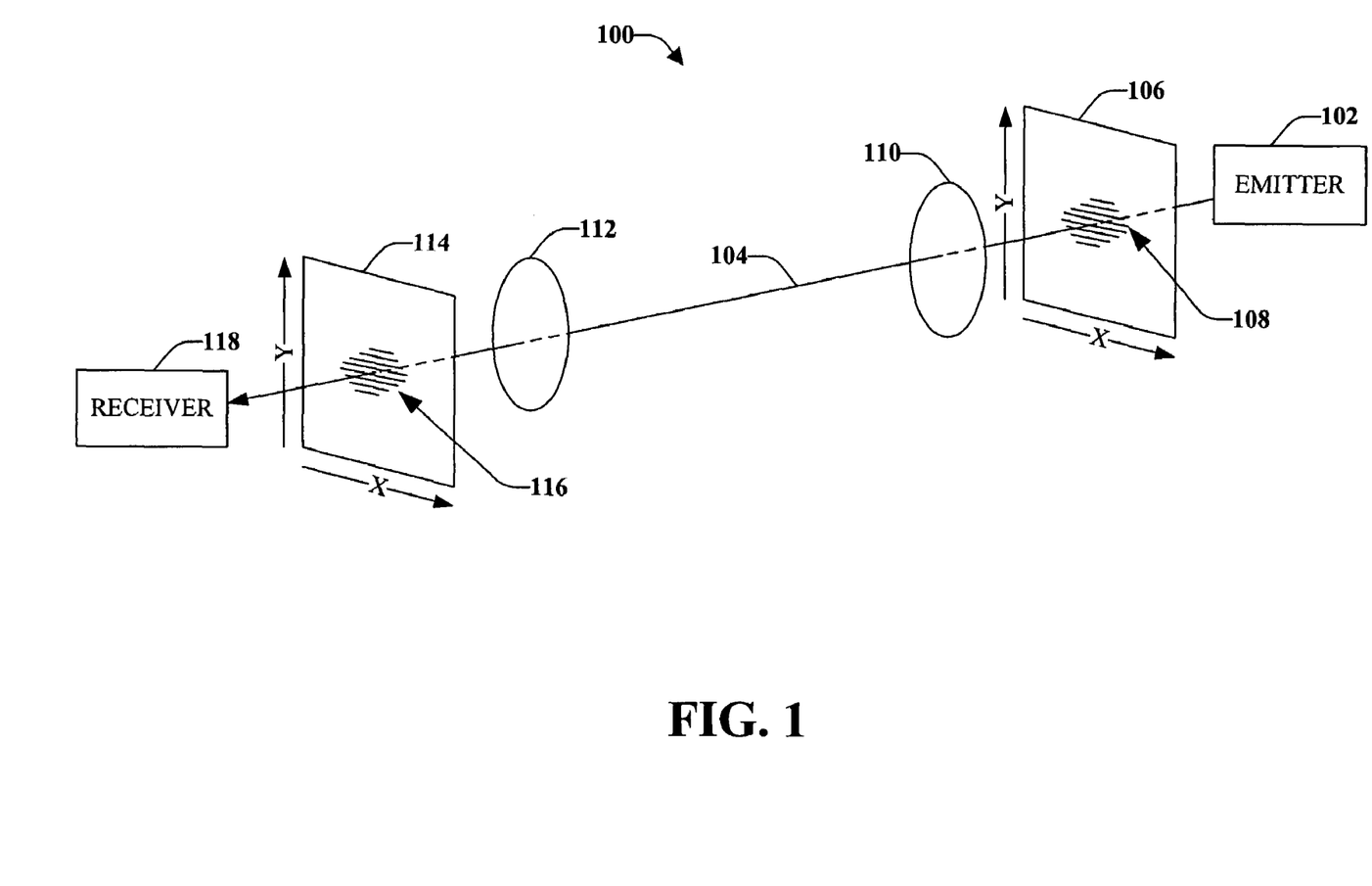
FIG. 1 illustrates a system that facilitates simplifying alignment of a light beam in a light curtain or similar safety feature in an industrial environment, in accordance with one or more aspects described herein.

Now referring to the drawings, FIG. 1 illustrates a system 100 that facilitates simplifying alignment of a light beam in a light curtain or similar safety feature in an industrial environment, in accordance with one or more aspects described herein. The system 100 facilitates tolerating misalignment (e.g., intentional and/or unintentional) comprises an emitter 102 that provides a beam of light 104, such as infrared light for example, that can be utilized to sense an impediment or other interruption in a region or space intended to be monitored by the light curtain. The emitter 102 can transmit the beam 104 through a first liquid crystal display (LCD) 106 that comprises a plurality of transmissive apertures 108. The light beam 104 can then pass through a first lens 110 after which the light beam 104 will traverse the monitored region. At an opposite side of the monitored area, the beam 104 can pass through a second lens 112 that can refocus the beam 104 onto a second LCD screen 114 comprising a second set of transmissive apertures 116. Once the beam 104 traverses the transmissive apertures 116, a receiver 118 receives the light beam.

The transmissive apertures 108 and 116 can be generated by manipulating their respective LCD screens, such that the LCD screens can be made opaque at all points where light is not to be transmitted through the screen and clear or translucent at points corresponding the transmissive apertures 108 and 116. In this manner, the apertures can be moved as desired in order to accommodate variable beam direction across the monitored area (e.g., intentional and/or unintentional misalignment). For example, during a first beam transmission, it may be desirable to transmit the light beam 104 straight across the monitored area. However, during subsequent beam transmissions, a particular light curtain application may require that beam direction be varied in order to facilitate monitoring a larger region of space. In such a case, a second transmission can be generated that travels from, for instance, a top left portion of the first LCD 106 to a bottom right portion of the second LCD 114. As will be appreciated by one skilled in the art, any combination or permutation of transmission start points and end points can be generated and utilized with regard to LCDs 106 and 114 (e.g., top-to-bottom, bottom-to-bottom, left-to-middle, . . . ), and any number of sub-regions can be designated for LCDs 106 and 114, through which light may be passed. It will further be appreciated that the transmissive apertures 108 and 116 can be relocated in accordance with a particular path of the light beam 104 in order to permit the light beam 104 to pass through LCDs 106 and 114, regardless of the orientation of the light beam, as will be discussed in greater detail with regard to the following figures.

Figure 2:
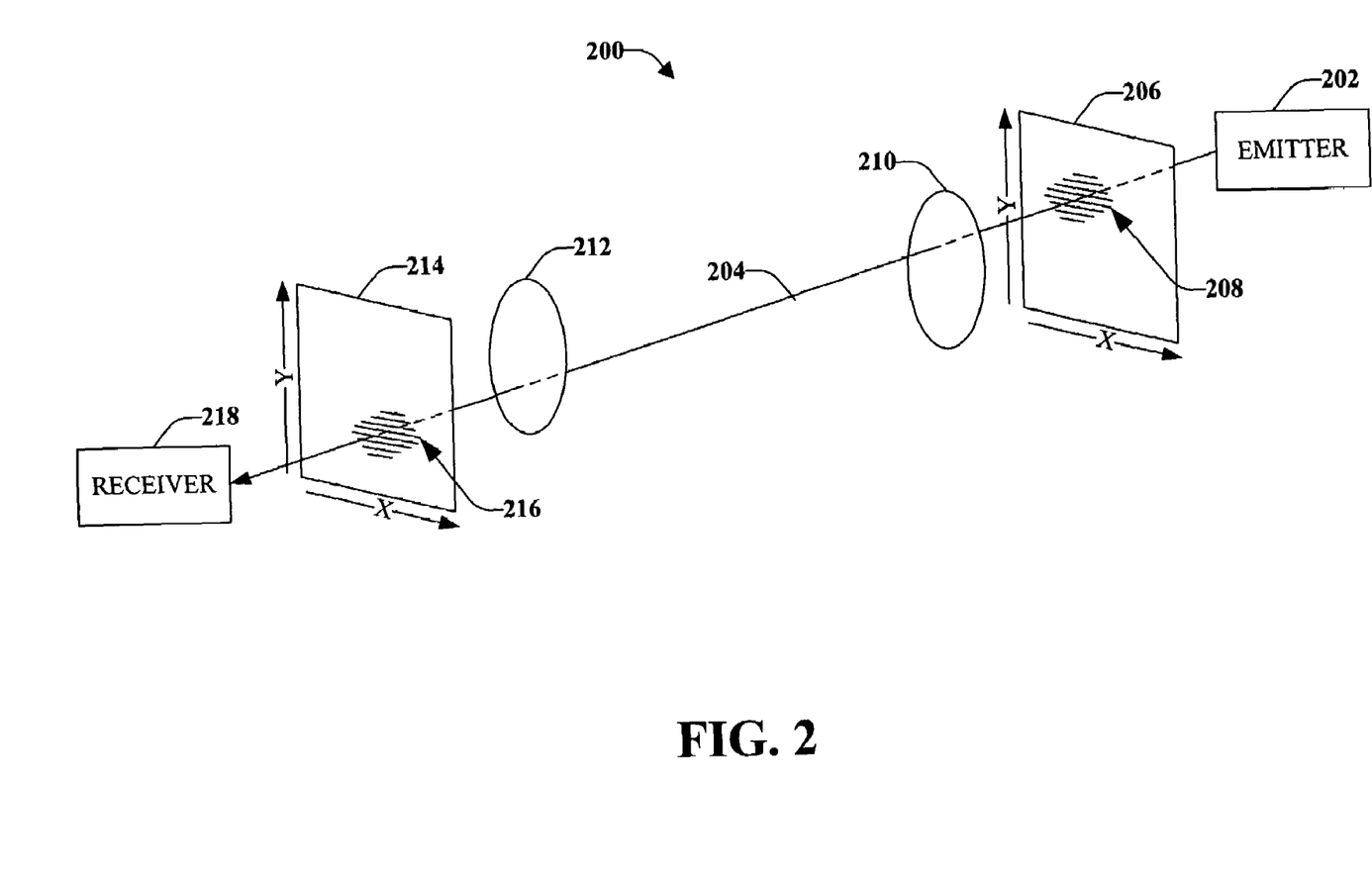
FIG. 2 illustrates a system wherein a light beam in a light curtain or similar monitoring device is misaligned, in accordance with one or more aspects.

FIG. 2 illustrates a system 200 wherein a light beam in a light curtain or similar monitoring device is misaligned, in accordance with one or more aspects. The system 200 comprises an emitter 202 that emits a light beam 204 (e.g., infrared, laser, . . . ), which can eventually be received by a receiver 218 (e.g., a detector, . . . ). The light beam can be passed through a first LCD screen 206 comprising a plurality of transmissive apertures 208 through which the light beam 204 may pass. The transmissive apertures 208 can be generated by darkening the entire LCD screen 206 except at a desired location of the transmission apertures 208. The light beam 204 can pass through the transmissive apertures 208, and then through a lens 210 that focuses the light beam 204 for traversing a monitored area. At an opposite side of the monitored area, the light beam 204 can be refocused by a second lens 212 for passing through a second LCD 214 screen with transmissive apertures 216. The transmissive apertures 216 can be generated on the LCD 214 as desired in a predicted or known path of the beam 204 in order to permit the beam 204 to pass through the LCD 214 and be received by the receiver 218.

It will be noted that the light beam 204 is misaligned according the system 200, which can be detrimental to system function when employing conventional light curtains or similar systems. However, such misalignment, whether intended or unintentional, can be tolerated by and/or corrected in accordance with one or more aspects presented herein. For example, the misalignment can be an undesired product of environmental factors, such as temperature, vibration, etc., or can be intended misalignment as described above with regard to FIG. 1, wherein the light beam is transmitted on multiple paths across the monitored area to maximize coverage.

Figure 3:
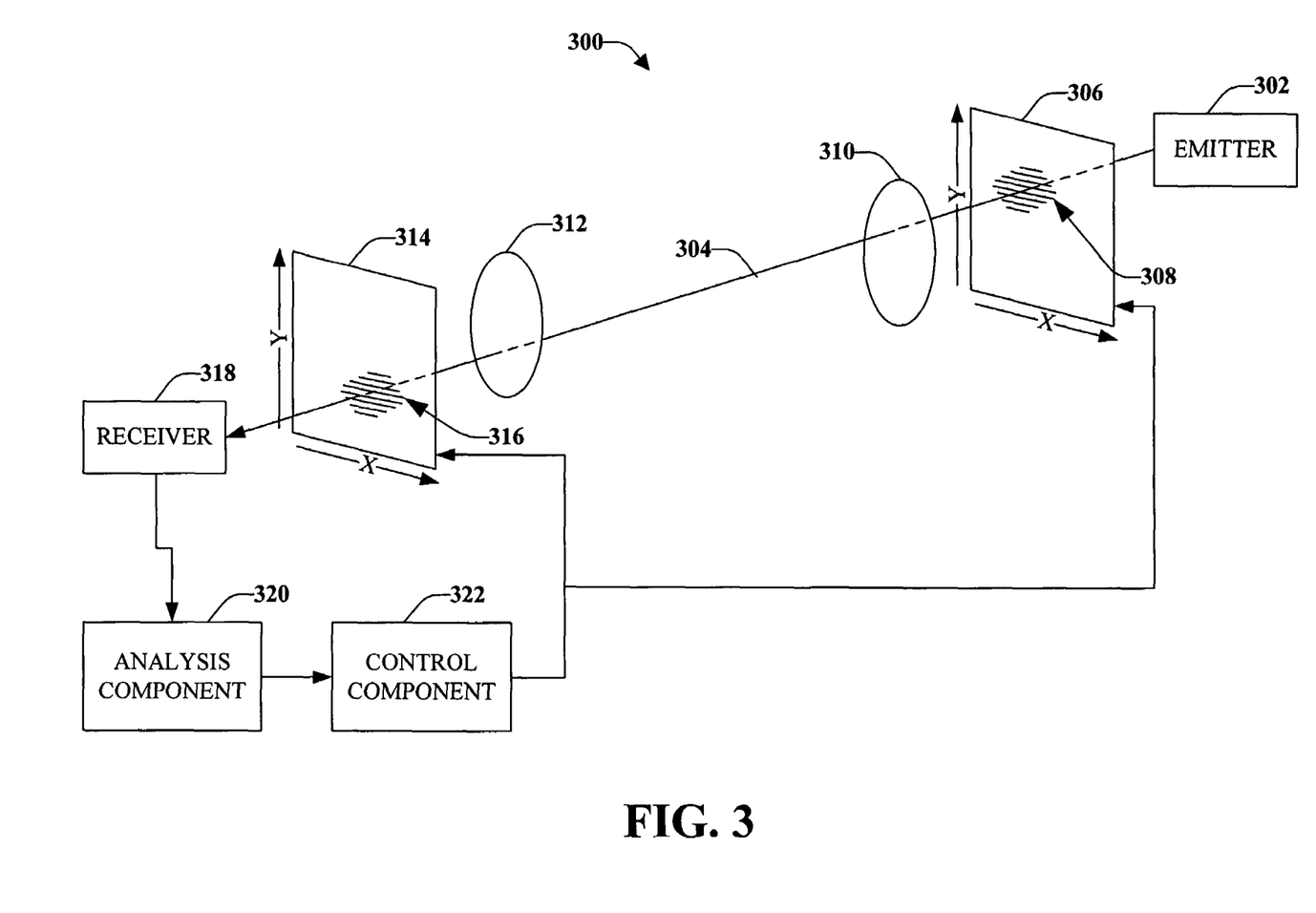
FIG. 3 illustrates a system that facilitates tolerating a misaligned light beam in a light curtain or other similar device, in accordance with one or more aspects.

FIG. 3 illustrates a system 300 that facilitates tolerating a misaligned light beam in a light curtain or other similar device, in accordance with one or more aspects. The system 300 comprises a beam emitter 302 that generates a beam 304 of, for example, infrared light for transmission across a desired region of space. The beam 304 passes through a first LCD 306 via a plurality of transmissive apertures 308 that can be generated in a known path of the beam 304. The beam 304 is then focused by a first lens 310 for transmission across a desired line in the monitored space. At an opposite side of the monitored space, the beam 304 can be refocused by a second lens 312 onto a second LCD 314, and transmissive apertures 316 can be generated on the LCD 314 to permit the beam 304 to pass through the LCD 314 to a receiver 318.

As illustrated, the beam 304 is misaligned (e.g., due to environmental factors such as vibration, variations in temperature, intentional misalignment, . . . ). In order to facilitate tolerating such misalignment, the system 300 comprises an analysis component 320 that receives information from the receiver 318 and evaluates parameters associated with the beam 304. Such parameters can comprise, without being limited to, for instance, Cartesian coordinates associated with the point(s) of traversal of the beam across LCDs 306 and 314, sub-regions of the LCDs 306 and 314 in which transmissive apertures 308 and 316 are generated, an angle of transmission of the beam, an angle of incidence on the second LCD layer 314, or any other suitable information associated with beam transmission, aperture generation, misalignment toleration, etc. A control component 322 can then receive processed information from the analysis component 320 and can generate one or more control signals for altering aperture placement and/or width on one or both of the LCDs 306 and 314 to ensure that the beam is received at the receiver 318. In this manner, the system 300 can facilitate tolerating a misaligned beam 304 in order to ensure that an apparatus being monitored in, for instance, an industrial environment (e.g., a factory, an assembly line, a processing plant, . . . ) does not register a false alarm merely because beam in a light curtain is misaligned.

Figure 4:
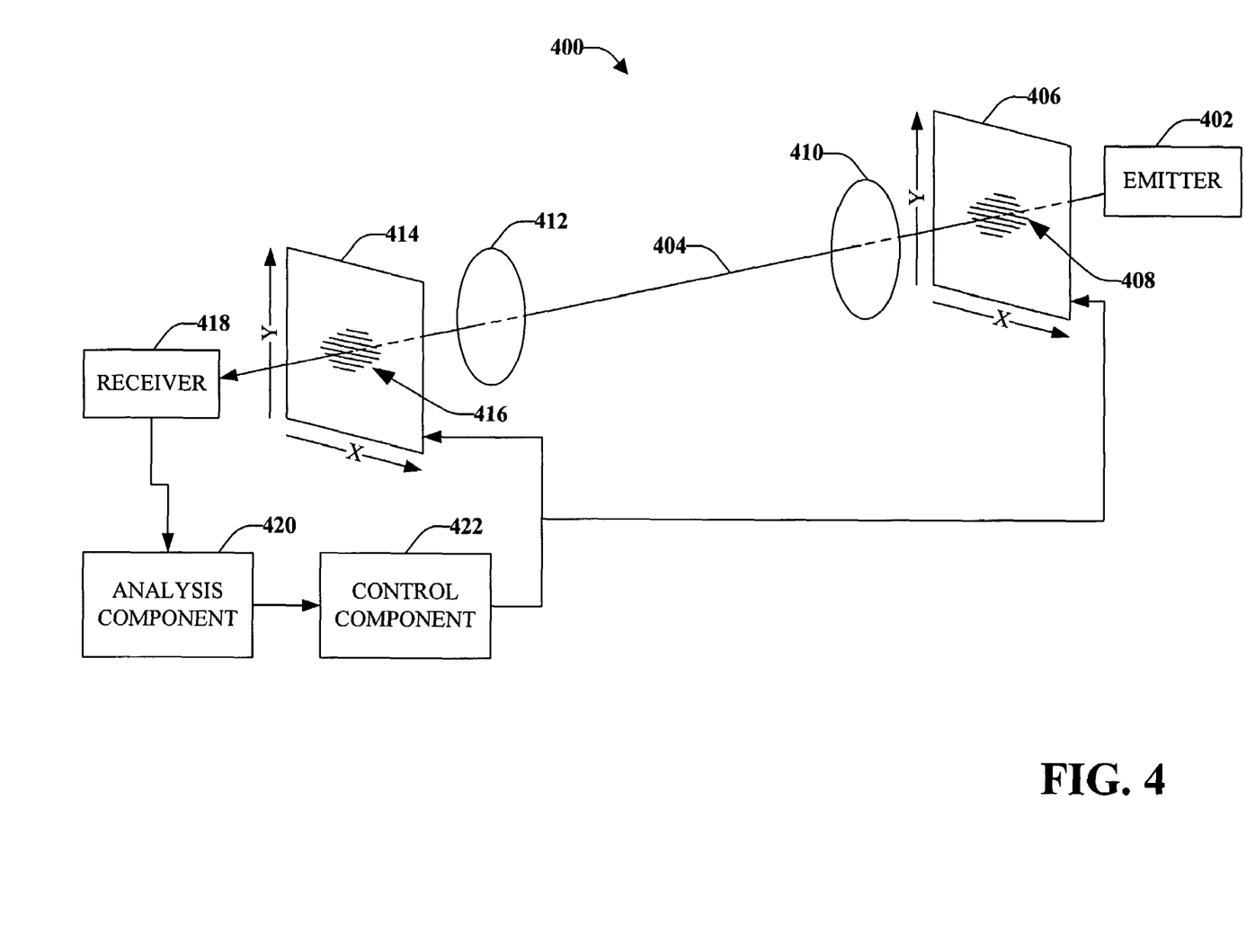
FIG. 4 is an illustration of a system that facilitates correcting a misaligned light beam in a light curtain or other similar device, in accordance with one or more aspects.

FIG. 4 is an illustration of a system 400 that facilitates correcting a misaligned light beam in a light curtain or other similar device, in accordance with one or more aspects. The system 400 can comprise an emitter 402 that generates a beam 404 of light (e.g., infrared, laser, . . . ) for transmission across a region of space that is to be monitored. The beam 404 passes through a first LCD 406 via a plurality of transmissive apertures 408 that can be generated in a path of the beam 404. The beam 404 is then focused by a first lens 410 for transmission across the monitored space. At an opposite side of the monitored space, the beam 404 can be refocused by a second lens 412 onto a second LCD 414, and transmissive apertures 416 can be generated on the LCD 414 to permit the beam 404 to pass through the LCD 414 to a receiver 418.

According to the figure, the beam 404 is maintained in an aligned state, despite a plurality of factors that can potentially contributed to undesired misalignment. To facilitate maintaining such alignment, the system 400 comprises an analysis component 420 that receives information from the receiver 418 and evaluates parameters associated with the beam 404, such as, but not limited to, x- and y-coordinates associated with the point(s) of traversal of the beam across LCDs 406 and 414, areas of the LCDs 406 and 414 in which transmissive apertures 408 and 416 are generated, angle(s) of transmission of the beam, angle(s) of incidence on the second LCD layer 414, or any other suitable information associated with beam transmission, aperture generation, misalignment correction, and the like. A control component 422 receives processed information from the analysis component 420 and generates one or more control signals for altering aperture placement and/or width on one or both of the LCDs 406 and 414 to ensure that the beam is received at the receiver 418. Thus, the system 400 can facilitate correction of a misaligned beam 404 through a continuous and/or periodic electronic feedback loop that is initiated from the receiver 418, through the analysis component 320 and the control component 422 to one or both of the LCDs 406 and 414. By providing feedback to LCDs 406 and 414, critical alignment of the beam 404 can be maintained and/or recovered despite factors such as temperature variation, vibration, and/or any other contributing cause of misalignment that might be experienced in an industrial environment in which the light curtain is employed, such as a factory or assembly line, a piece of heavy machinery, etc.

Figure 5:
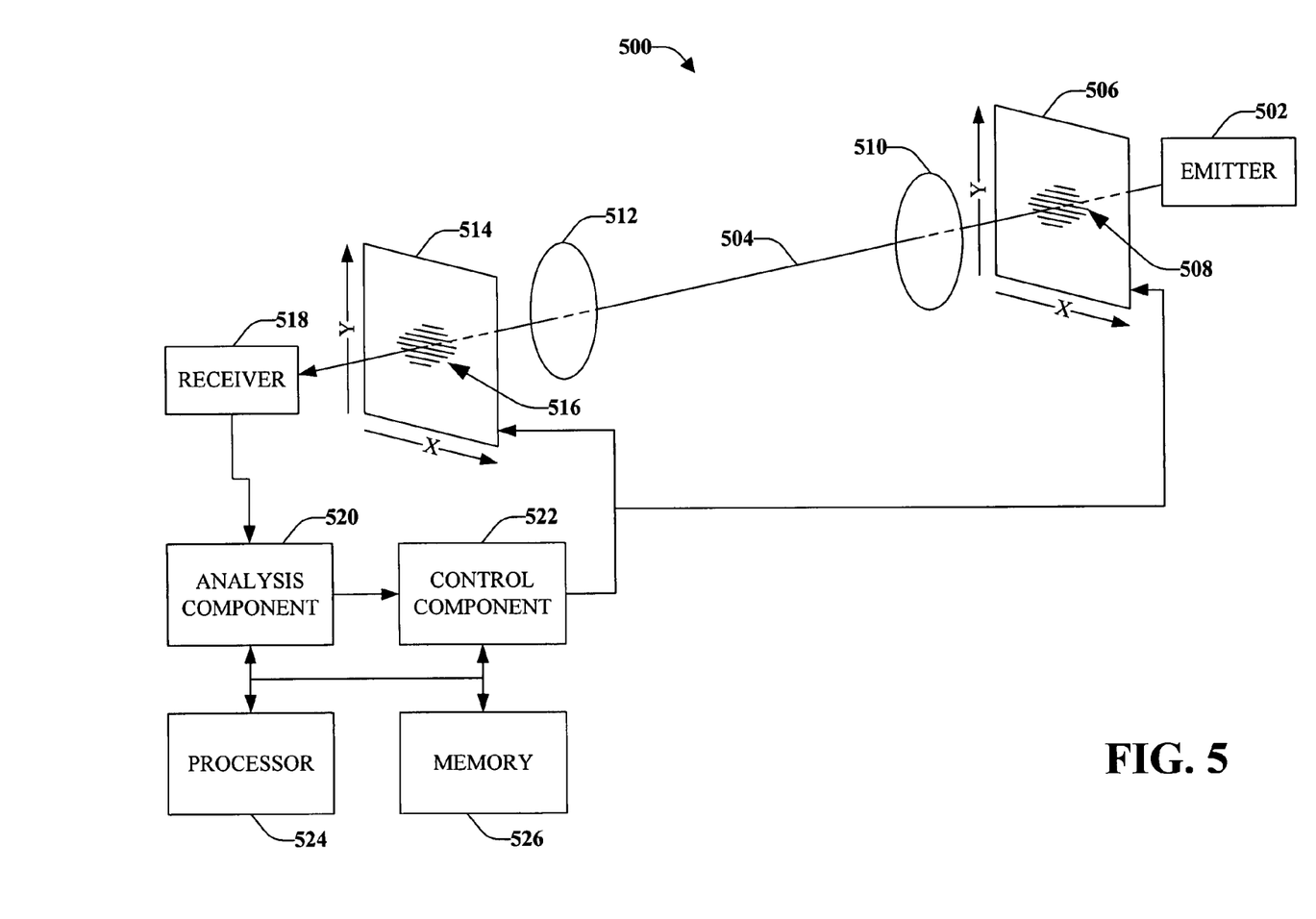
FIG. 5 illustrates a system that facilitates tolerating and/or correcting misalignment of a light beam in a light curtain or other light transmission device, in accordance with one or more aspects described herein.

FIG. 5 illustrates a system 500 that facilitates tolerating and/or correcting misalignment of a light beam in a light curtain or other light transmission device, in accordance with one or more aspects described herein. The system 500 comprises a beam emitter 502 that generates a light beam 504 transmission across a monitored space. The beam 504 passes through a first LCD 506 via a plurality of transmissive apertures 508, is focused by a first lens 510 for transmission across a desired line in the monitored space, and refocused by a second lens 512 onto a second LCD 514. Transmissive apertures 516 can be generated on the LCD 514 to permit the beam 504 to pass through the LCD 514 to a receiver 518, as described with regard to preceding figures. The system 500 further comprises an analysis component 520 that receives information from the receiver 518 and provides data to a control component 522, as described with regard to FIGS. 3 and 4.

In performing various analyses and/or generating control signals to provide real-time feedback to LCDs 506 and 514, analysis component 520 and control component 522 can be operatively associated with a processor 524 and a memory 526, each of which may further be operatively coupled to the other. As will be appreciated by those skilled in the art, the processor 524, analysis component 520, and/or control component 522 can exist as a single component (e.g., a processor that performs multiple functions, . . . ). However, such components are described herein separately despite potentially overlapping functionality in order to clearly delineate various aspects associated with the functionality of the system 500.

The processor 524 can be a processor dedicated to analyzing information associated with the analysis component 520, control component 522, and/or memory 526, a processor that facilitates providing electronic feedback to LCDs 506 and 514, a processor used to control one or more of the components of the system 500, or, alternatively, a processor that is both used to analyze information, provide electronic feedback to LCDs 506 and 514, and to control one or more of the components of the system 500. The memory component 526 can be employed to retain information associated with light beam alignment, misalignment, tolerance thresholds, corrective action, and/or any other information related to the system 500.

Furthermore, the memory 526 can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory of the present systems and methods is intended to comprise, without being limited to, these and any other suitable types of memory.

Referring to FIGS. 6-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
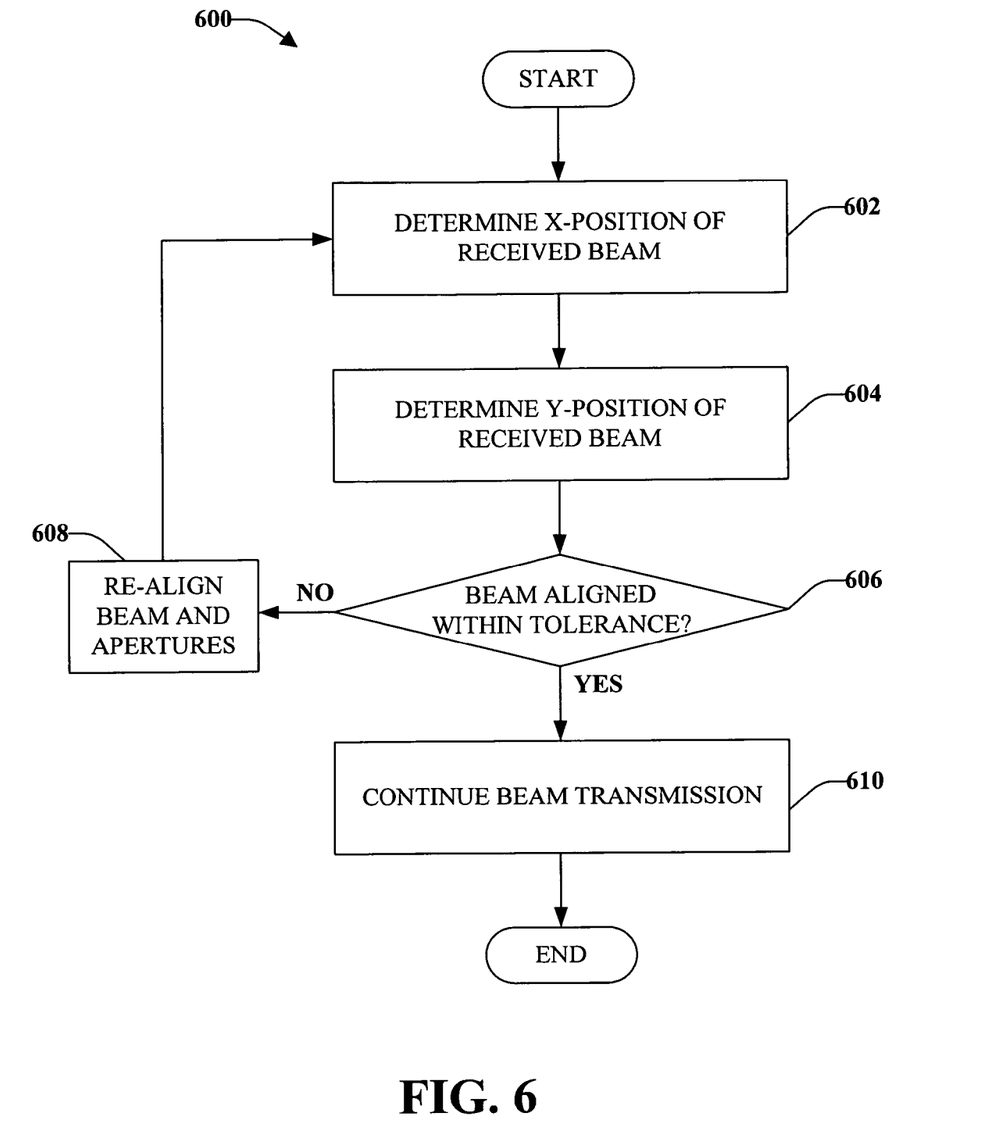
FIG. 6 is an illustration of a methodology for tolerating misalignment and/or providing corrective feedback to adjust a misaligned beam in a safety device such as a light curtain in an industrial environment, in accordance with one or more aspects.

FIG. 6 is an illustration of a methodology 600 for tolerating misalignment and/or providing corrective feedback to adjust a misaligned beam in a safety device such as a light curtain in an industrial environment, in accordance with one or more aspects. The method 600 can comprise analyzing light beam alignment from a receiver side of a monitored area. At 602, a determination can be made regarding an x-coordinate associated with a received light beam on a plane delineated by an LCD layer through which the light beam passes in order to be received by the receiver. Such determination can be made, for example, based at least in part upon information related to a point and angle of reception of the light beam at the receiver and/or knowledge of a distance between the LCD and the receiver. Additionally and/or alternatively, knowledge of a position of one or more apertures generated on the LCD. At 604, a similar determination can be made with regard to the y-coordinate of the light beam as it crosses the LCD prior to reaching the receiver. The x- and y-coordinates can be compared to predetermined threshold value ranges to determine whether they are within an acceptable target tolerance, at 606. For instance, the predetermined range of x- and y-coordinates can be delineated by the LCD perimeter, a region or zone of the LCD, or any suitable predefined coordinate ranges. If the comparison of the Cartesian coordinates of the received beam is within the predetermined tolerance, then the beam can be considered properly aligned, and the method can proceed to 610, where beam transmission can continue as normal.

In the event that the comparison at 606 indicates that the beam is not within tolerance, or misaligned, then the beam and LCD apertures through which the beam passes can be realigned using electronic feedback at 608. The method can then revert to 602 for further iteration until the beam is determined to be within the desired target tolerance. Realignment of the beam at 608 can comprise, for example, repositioning and/or restructuring transmissive apertures generated on a receiving-side LCD, and/or on an emitter-side LCD, as described above with regard to FIGS. 1-5. The transmissive apertures can thus be employed to govern a general direction of the light beam, and can be manipulated to facilitate beam alignment via electronic feedback.

Figure 7:
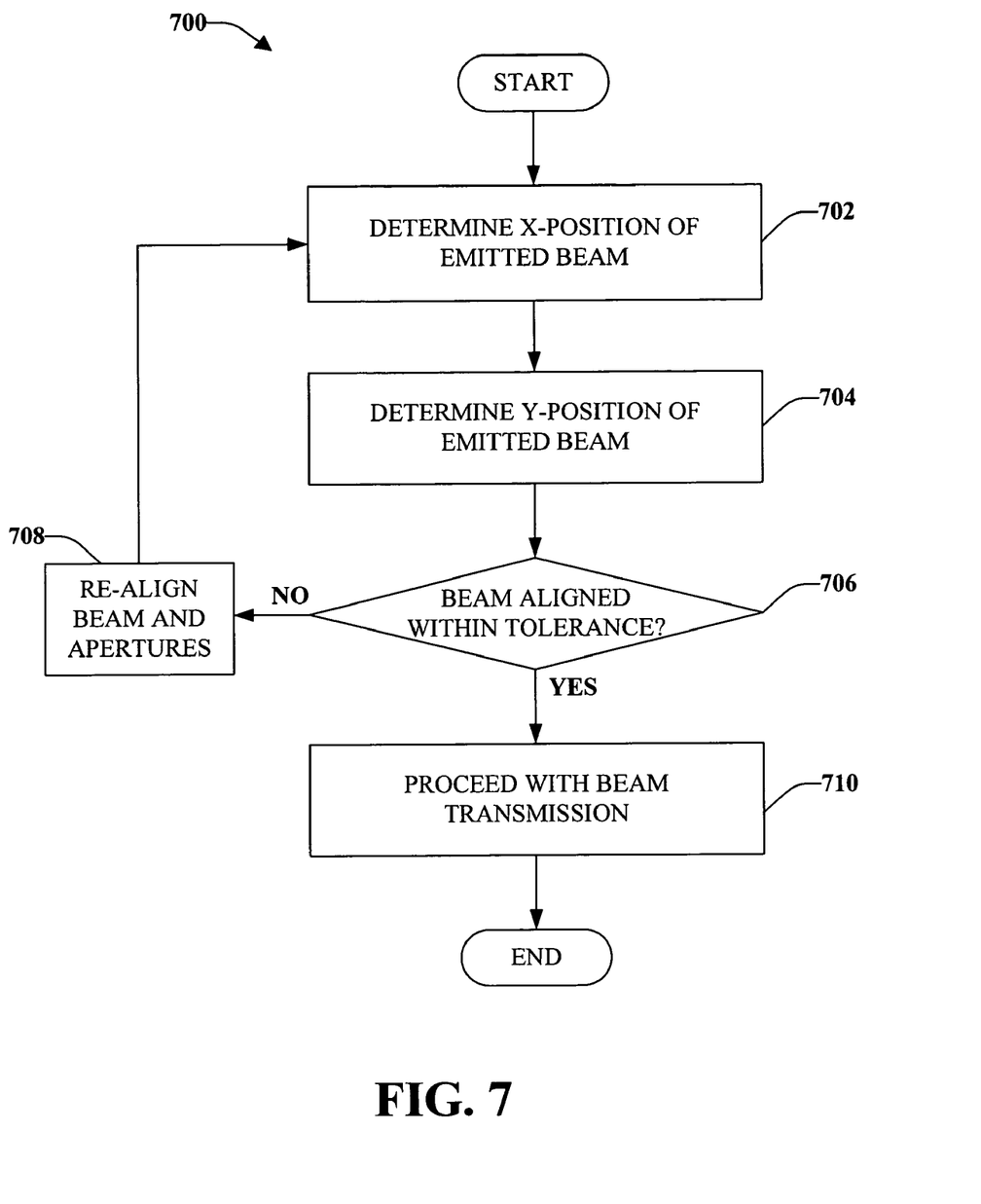
FIG. 7 illustrates a methodology for tolerating misalignment and/or providing corrective feedback for unintentional or intentional misalignment of a light beam in a light curtain, in accordance with various aspects.

FIG. 7 illustrates a methodology 700 for tolerating misalignment and/or providing corrective feedback for unintentional or intentional misalignment of a light beam in a light curtain, in accordance with various aspects. The method 700 can comprise analyzing light beam alignment from an emitter side of a monitored area. For instance, at 702, an x-coordinate of the light beam can be determined based on a known path of the light beam through one or more transmissive apertures generated on an LCD between the emitter and the monitored area. At 704, a similar determination can be made with regard to the y-coordinate of the light beam as it crosses the LCD prior to reaching the receiver. The x- and y-coordinates can be compared to predetermined threshold value ranges to determine whether they are within an acceptable target tolerance, at 706. For instance, the predetermined range of x- and y-coordinates can be delineated by the LCD perimeter, a region or zone of the LCD, or any suitable predefined coordinate ranges. If the comparison of the Cartesian coordinates of the emitted beam is within the predetermined tolerance as it crosses the emitter-side LCD, then the beam can be considered properly aligned, and the method can proceed to 710, where beam transmission can continue as normal.

In the event that the comparison at 706 indicates that the beam is not within tolerance, or misaligned, then the beam and LCD apertures through which the beam passes can be realigned using electronic feedback at 708. The method can then revert to 702 for further iteration until the beam is determined to be within the desired target tolerance. Realignment of the beam at 708 can comprise, for example, repositioning and/or restructuring transmissive apertures generated on an emitting-side LCD, and/or on a receiver-side LCD, as described above with regard to FIGS. 1-5. The transmissive apertures can thus be employed to govern a general direction of the light beam, and can be manipulated to facilitate beam alignment via electronic feedback.

Figure 8:
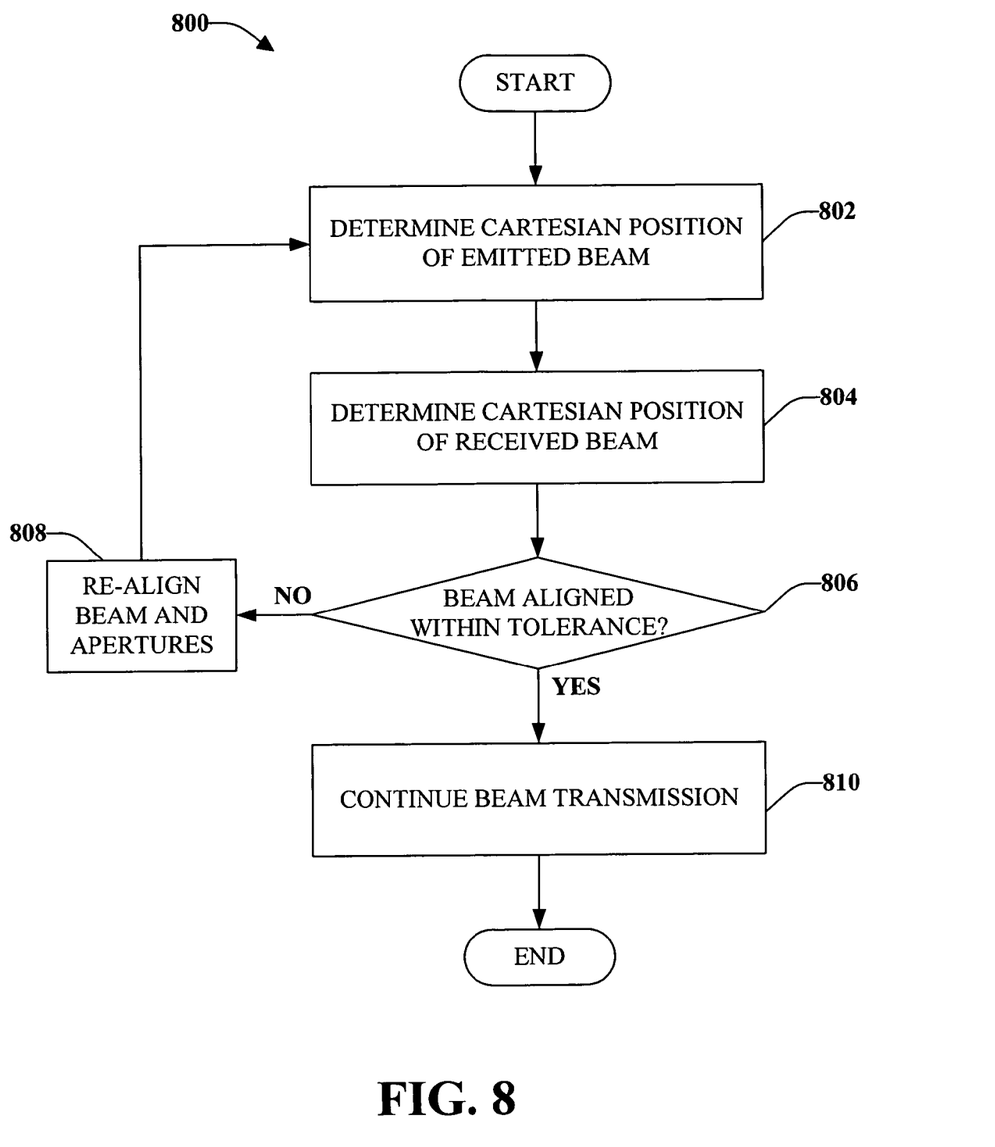
FIG. 8 is an illustration of a methodology for tolerating and/or remedially correcting intended or unintended misalignment of a light beam in a light curtain, in accordance with one or more aspects presented herein.

FIG. 8 is an illustration of a methodology 800 for tolerating and/or remedially correcting intended or unintended misalignment of a light beam in a light curtain, in accordance with one or more aspects presented herein. At 802, a Cartesian position (e.g., x- and y-coordinates) of an emitted light beam can be determined for a beam as it traverses one or more transmissive apertures generated on a back-lit LCD near an emitter. The position determination can be made based at least in part on the position of the apertures through which the light beam passes. At 804, a determination of the Cartesian coordinates of the beam as it passes through a second LCD near a receiver may be made. Thus, the coordinates of the beam may be evaluated at both an emitter side and a receiver side of an area through which the light passes (e.g., a monitored area, in the case of a light curtain, . . . ). At 806, the coordinates of the beam at both sides of the monitored area may be assessed to determine whether the beam is within a desired tolerance. For instance, predetermined x- and y-coordinate ranges may be utilized for comparison to detected x- and/or t-coordinates for the light beam as it traverses either or both of the LCDs. If it is determined at 806 that the detected position(s) of the light beam are within the predetermined tolerance threshold range(s), then the method may proceed to 810, where beam transmission may continue without adjustment.

If, at 806, it is determined that one or both of the x- and t-coordinates are not within the threshold range(s), at either or both of the LCDs, then at 806 the beam and/or apertures may be realigned (e.g., via electronic feedback from a control component to one or both LCDs). For instance, upon a determination that the light beam is out of tolerance at the receiver-side LCD, then transmissive apertures on the receiver-side LCD, as well as on the emitter-side LCD, may be moved (e.g., generated at different coordinates) to facilitate beam re-alignment. Moving the transmissive apertures at the emitter-side LCD permits light from the emitter to pass through the LCD at a more desirable location, which may then be focused by a lens on the emitter side of a monitored area for transmission across the monitored area. The beam can be re-focused (e.g., focused, diffracted, scattered, . . . ) by a lens at an opposite side of the monitored area, and then passed through transmissive apertures on the receiver-side LCD before being detected by a receiver. The receiver-side LCD may also receive electronic feedback to move the transmissive apertures thereon to permit passage of the light beam in accordance with the new position of the light beam. In this manner, both emitter-side and receiver-side beam coordinates may be utilized, analyzed, and re-aligned using electronic feedback to maintain the light beam within a predetermined target tolerance. Additionally, the Cartesian ranges employed in defining the target region need not encompass the entire LCD, but may alternatively define a portion of the LCD (e.g., center, top-right, left-center, . . . ). Thus, the light curtain in which the beam is employed need not be perfectly aligned to monitor a desired area because the light beam can be intentionally aligned off-center and still monitor the desired area.

Figure 9:
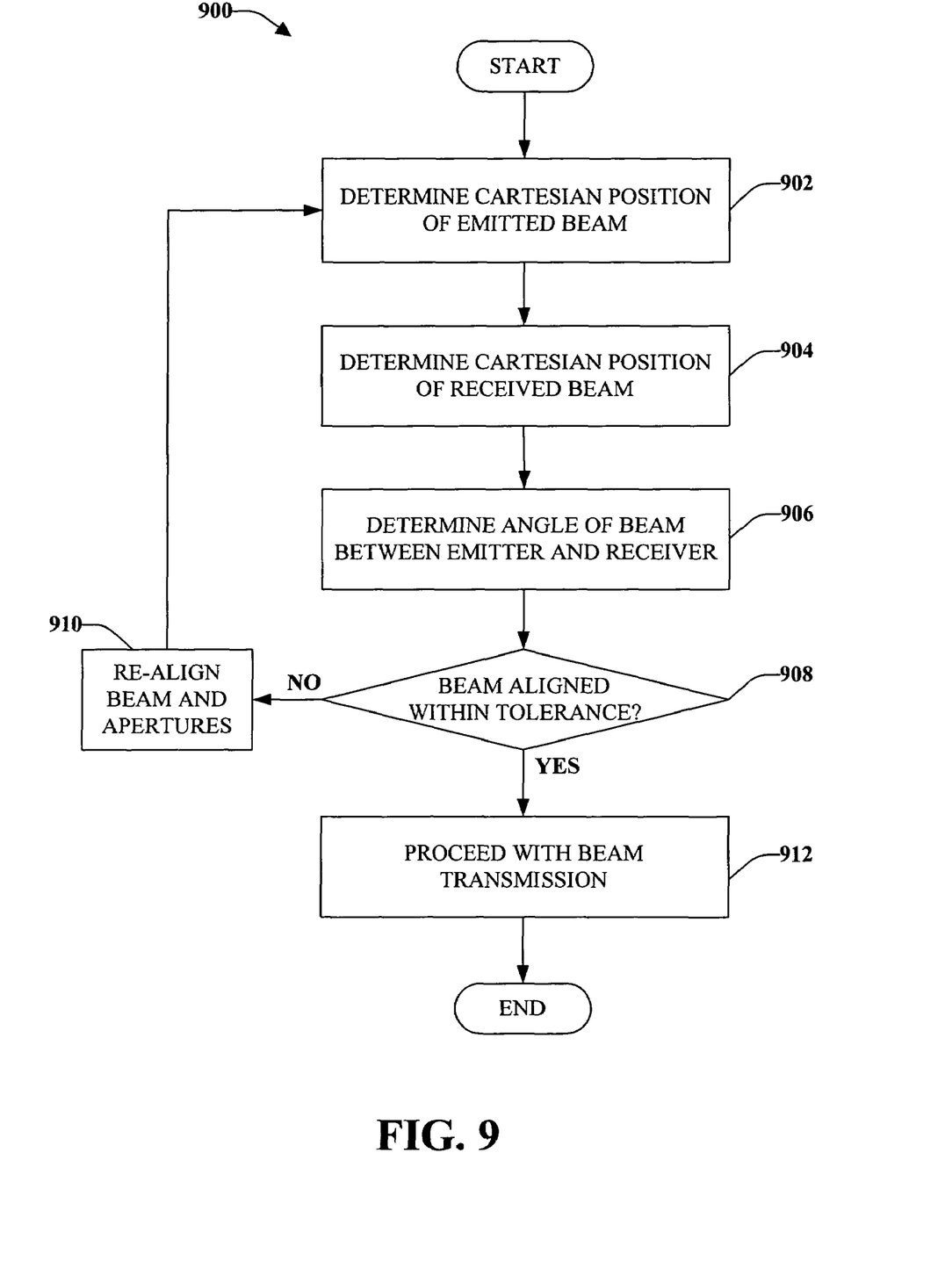
FIG. 9 illustrates a methodology for tolerating and/or correcting misalignment of a light beam in a light curtain while accounting for an angle of transmission of the light beam, in accordance with one or more aspects.

FIG. 9 illustrates a methodology 900 for tolerating and/or correcting misalignment of a light beam in a light curtain while accounting for an angle of transmission of the light beam, in accordance with one or more aspects. At 902, Cartesian coordinates associated with the light beam as it traverses transmissive apertures in an emitter-side LCD can be determined. Similarly, Cartesian coordinates of the beam as it passes through transmissive apertures on a receiver-side LCD can be evaluated at 904. At 906, an angle of transmission of the beam can be determined base at least in part on information associated with the positions of the emitter-side LCD and the receiver-side LCD relative to each other, as well as the coordinates of the beam as it passes through each LCD as determined at 902 and 904. At 908, a determination can be made regarding whether the beam is aligned within a target tolerance by comparing the angle of the beam to a predetermined threshold range of acceptable angles.

For example, the threshold range can be predefined to have acceptable transmission angles from 0-10 degrees (e.g., from horizontal). According to this example, if the angle of transmission is determined to be, for instance, 2.45 degrees (or some other suitable angle less than or equal to 10 degrees), then the method can proceed to 912, where transmission can continue as normal because the angle of transmission is determined to be within tolerance. If, however, the angle of transmission is determined to be, for instance, 10.15 degrees from horizontal, then the light beam is out of tolerance and the method can proceed to 910 for beam and/or transmissive aperture re-alignment.

According to a related example, the desired target angle can be 0 degrees, with an acceptable deviation of, for instance, 6 degrees (e.g., +/−6 degrees). In such a scenario, the emitter can continue to emit the light beam as long as the transmission angle is not more than 6 degrees from horizontal. Upon a first indication (e.g., measured angle, . . . ) that the beam is out of tolerance, 910 can be initiated to restore the beam to a transmission angle within tolerance. Restoration of the beam can be, for instance, to an angle that is just within tolerance (e.g., to 5.9 degrees from horizontal according to the example), can be substantially complete restoration (e.g. back to 0 degrees, or horizontal), or anywhere in between. Moreover, it will be appreciated that the threshold tolerances described above are exemplary in nature and are not intended to limit the scope of the various aspects described here. Rather, any desirable threshold range can be utilized for the Cartesian coordinates of the beam as it passes through one or both LCDs, as well as for the angle of transmission of the beam. In this manner, the various systems and/or methods described above can be utilized to control a light beam and/or a light curtain employing the light beam with accuracy and without requiring alignment of the emitter and receiver. Rather, the emitter and receiver can be misaligned while the transmissive apertures on the LCDs and the associated lenses can be utilized to tolerate the misalignment and/or correct there for to ensure that the light beam traverses an intended region of the monitored area.

Figure 10:
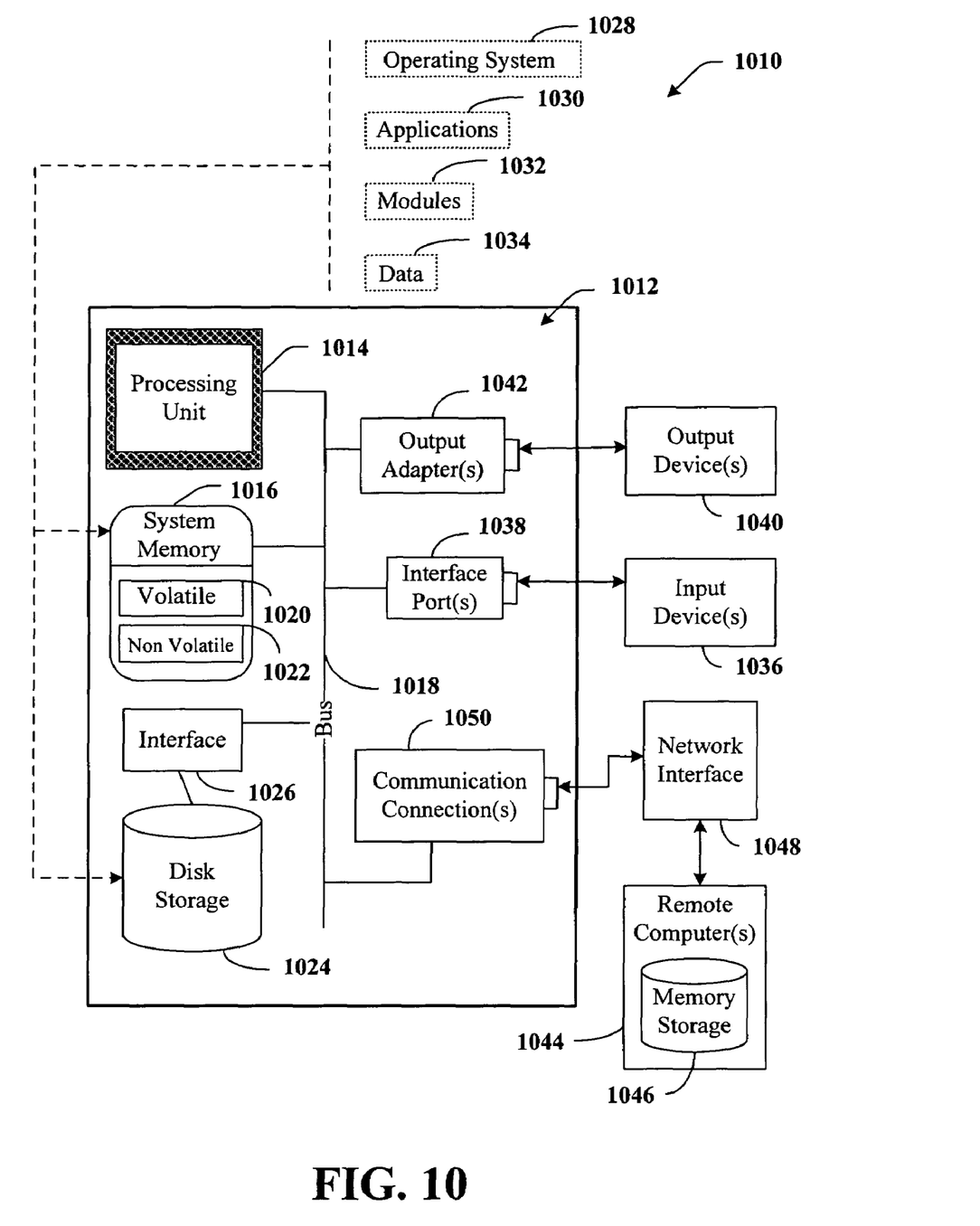
FIG. 10 is an exemplary computing environment that can be utilized in connection with the claimed subject matter.

With reference to FIG. 10, an exemplary environment 1010 for implementing various aspects of the claimed subject matter, including controlling operation of a machine and analyzing optical signals, includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates correcting misalignment in a light curtain, comprising:
   a back-lit LCD that selectively permits light from an emitter to pass through transmissive apertures generated on the LCD;
   a first lens that focuses light that has passed through the transmissive apertures on the back-lit LCD to generate the light beam that traverses a monitored area;
   a second LCD that selectively permits a light beam that has traversed the monitored area to pass through transmissive apertures generated on the second LCD to a receiver;
   a second lens that re-focuses the light beam at an opposite side of the monitored area prior to passing through the transmissive apertures on the second LCD; and
   a control component that provides feedback information to at least one of the LCDs to adjust a position of the transmissive apertures generated thereon when the light beam is determined to be misaligned.

2. The system of claim 1, further comprising an analysis component that determines a position of the light beam as it passes through at least one of the back-lit LCD and the second LCD.

3. The system of claim 2, wherein the position of the light beam is quantified by an x-coordinate and a y-coordinate.

4. The system of claim 3, wherein the analysis component determines whether the x-coordinate and y-coordinate are within a predetermined threshold range, respectively, wherein the light beam is misaligned if at least one of the x-coordinate and the y-coordinate is outside a respective predetermined threshold range.

5. The system of claim 4, wherein the control component generates a feedback signal to one or both of the LCDs to adjust a position of the transmissive apertures generated thereon to re-align the light beam.

6. A method of correcting misalignment of a light beam in a light curtain, comprising:
- employing a first LCD between an emitter and a monitored area on a first side of the monitored area;
- employing a first lens to focus the light beam at the first side of the monitored area after the light beam has traversed the transmissive apertures on the first LCD;
- employing a second LCD between the monitored area and a receiver on a second side of the monitored area;
- employing a second lens to re-focus the light beam on the second side of the monitored area before passing the light beam through the transmissive apertures on the second LCD; and
- selectively generating transmissive apertures on the first and second LCDs to control a position of a light beam.

7. The method of claim 6, further comprising determining Cartesian coordinates of the light beam as it passes through the transmissive apertures on at least one of the first and second LCDs to evaluate a path of the light beam.

8. The method of claim 7, further comprising comparing the Cartesian coordinates to a predetermined threshold range of coordinates to determine whether the Cartesian coordinates are within the threshold range.

9. The method of claim 8, further comprising re-aligning the light beam if the Cartesian coordinates are not within the threshold range.

10. The method of claim 9, wherein re-aligning the light beam comprises generating a feedback signal that is transmitted to at least one of the first and second LCDs to adjust a position of the transmissive apertures thereon.

11. The method of claim 10, further comprising regenerating transmissive apertures in a new position on at least one of the first and second LCDs to alter the path of the light beam and re-align the light beam, wherein the transmissive apertures are regenerated by manipulating the LCDs, such that the LCDs can be made opaque at all points where light is not to be transmitted through the LCD and clear or translucent at points corresponding the transmissive apertures.

12. The method of claim 6, further comprising determining an angle of transmission of the light beam across the monitored area.

13. The method of claim 12, further comprising comparing the angle of transmission to a predetermined threshold range of angles of transmission and evaluating whether the angle of transmission is within the threshold range.

14. The method of claim 13, further comprising regenerating transmissive apertures in a new position on one or both of the first and second LCDs to adjust the light beam if the angle of transmission is not within the predetermined threshold range, wherein the transmissive apertures are regenerated by manipulating the LCDs, such that the LCDs can be made opaque at all points where light is not to be transmitted through the LCD and clear or translucent at points corresponding the transmissive apertures.

* * * * *